(12) United States Patent
Chen et al.

(10) Patent No.: US 8,144,124 B2
(45) Date of Patent: Mar. 27, 2012

(54) OPTICAL SCROLLING MODULE AND OPTICAL CONTROL MODULE

(75) Inventors: Hui-Hsuan Chen, Hsinchu (TW); Hung-Ching Lai, Hsinchu (TW); Tien-Chia Liu, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 979 days.

(21) Appl. No.: 12/125,658

(22) Filed: May 22, 2008

(65) Prior Publication Data

US 2009/0251414 A1 Oct. 8, 2009

(30) Foreign Application Priority Data

Apr. 8, 2008 (TW) .............................. 97112722 A

(51) Int. Cl.
*G06F 3/033* (2006.01)
(52) U.S. Cl. ........ 345/163; 345/164; 345/165; 345/166; 345/156; 345/157
(58) Field of Classification Search .................. 345/156, 345/157, 163–166
See application file for complete search history.

(56) References Cited

U.S. PATENT DOCUMENTS 5,463,387 A * 10/1995 Kato ............................... 341/31
2007/0002020 A1 * 1/2007 Ranta et al. .................... 345/166
2008/0018602 A1 * 1/2008 Cheng et al. ................... 345/166

FOREIGN PATENT DOCUMENTS

CN 12474261 A 2/2004
CN 2658849 Y 11/2004

* cited by examiner

*Primary Examiner* — Richard Hjerpe
*Assistant Examiner* — Jeffrey Steinberg
(74) *Attorney, Agent, or Firm* — Chun-Ming Shih

(57) ABSTRACT

An optical scrolling module includes a prism, a light source, an image sensor and a first condenser. The prism is disposed at an opening of an upper shell of a mouse and has a light incident surface, a reflective surface, a contact surface and a light emitting surface. The contact and light incident surfaces are respectively connected between the reflective and light emitting surfaces. The contact surface is exposed by the opening. A light beam from the light source is transmitted to the contact surface via the light incident and reflective surfaces. When an object with a pattern structure puts on the contact surface, the light beam is scattered and a portion of the light beam is transmitted to the image sensor via the first condenser. When the object is removed from the contact surface, the light beam is reflected to the light emitting surface by the contact surface.

15 Claims, 4 Drawing Sheets

OPTICAL SCROLLING MODULE AND OPTICAL CONTROL MODULE

BACKGROUND

1. Field of the Invention

The present invention generally relates to a mouse and an optical control module, and more particularly to an optical scrolling module of a mouse and an optical control module adapted to be applied to a mouse.

2. Description of the Prior Art

FIG. 1 is a schematic view of an optical scrolling module of a conventional mouse. Referring to FIG. 1, an optical scrolling module 200 of a conventional mouse 100 is disposed in a housing 110 of the mouse 100. The housing 110 is composed of an upper shell 112 and a bottom shell 114. The upper shell 112 has an opening 112a, and a transparent plate 116 is disposed at the opening 112a. Furthermore, the optical scrolling module 200 comprises a light source 210, a lens 220 and a complementary metal-oxide-semiconductor (CMOS) image sensor 230, wherein the light source 210 and the CMOS image sensor 230 are electrically connected to a circuit board 130 of the mouse 100 through wires 120.

In addition, the light source 210 is for providing a light beam 212 to the transparent plate 116. When an user puts a finger 50 on the transparent plate 116, the light beam 212 is scattered by a fingerprint of the finger 50, and thus a portion of the light beam 212 is reflected to the lens 220 and then is focused to the CMOS image sensor 230 by the lens 220. The CMOS image sensor 230 is for converting an optical signal into an electrical signal. Thus, when the finger 50 moves on the transparent plate 116, the CMOS image sensor 230 could sense a moving direction of the finger 50, and then the mouse 100 could scroll a scroll bar in a window displayed by a screen according to the electrical signal provided by the CMOS image sensor 230.

In the conventional technique, all elements (i.e. the light source 210, the lens 220 and the CMOS image sensor 230) of the optical scrolling module 200 are integrated into one piece, and a shape of the optical scrolling module 200 needs to be modified for being applied to the housing 110 with different shape. Therefore, the scrolling module 200 of the conventional technique is not suitable for mass production, such that the production cost of the scrolling module 200 is higher.

BRIEF SUMMARY

The present invention provides an optical scrolling module to reduce the production cost.

The present invention further provides an optical control module capable of being applied to a mouse.

In order to achieve the above-mentioned advantages, an optical scrolling module in accordance with an embodiment of the present invention is provided. The optical scrolling module is adapted to be applied to a mouse. The mouse has a housing and a circuit board disposed in the housing, and an upper shell of the housing having an opening. The optical scrolling module comprises a prism, a light source, an image sensor and a first condenser. The prism is disposed at the opening and has a light incident surface, a reflective surface, a contact surface and a light emitting surface. The contact surface is connected between the reflective surface and the light emitting surface and is exposed by the opening, and the light incident surface is connected between the reflective surface and the light emitting surface and faces the circuit board. The light source is disposed on the circuit board for providing a light beam, the image sensor is disposed on the circuit board, and the first condenser is disposed between the image sensor and the prism. Further, the light beam is transmitted to the reflective surface via the light incident surface and is reflected to the contact surface by the reflective surface. When an object having a pattern structure contacts the contact surface, the light beam transmitted to the contact surface is scattered and then a portion of the light beam is transmitted to the image sensor via the first condenser. When the object is removed from the contact surface, the light beam is reflected to the light emitting surface by the contact surface.

In one embodiment of the present invention, an optical axis of the light beam is perpendicularly incident to the light incident surface.

In one embodiment of the present invention, a refractive index of the prism is between 1.2 and 1.9, an included angle between the reflective surface and the contact surface is between 50 degrees and 125 degrees, and an included angle between the reflective surface and the light incident surface is between 30 degrees and 60 degrees.

In one embodiment of the present invention, a depth of field (DOF) of the first condenser is between 5 millimeters and 30 millimeters.

In one embodiment of the present invention, the first condenser comprises at least a lens.

In one embodiment of the present invention, the optical scrolling module further comprises a second condenser disposed between the light source and the prism.

In one embodiment of the present invention, the second condenser comprises at least a lens.

An optical scrolling module in accordance with another embodiment of the present invention is provided. The optical control module comprises a light source, a prism, an image sensor and a first condenser. The light source is for providing a light beam. The prism has a light incident surface, a reflective surface, a contact surface and a light emitting surface. The contact surface is connected between the reflective surface and the light emitting surface, and the light incident surface is connected between the reflective surface and the light emitting surface and faces the light source. The first condenser is disposed between the image sensor and the prism. The light beam is transmitted to the reflective surface via the light incident surface and is reflected to the contact surface by the reflective surface, when an object having a pattern structure contacts the contact surface, the light beam transmitted to the contact surface is scattered and then a portion of the light beam is transmitted to the image sensor via the first condenser, when the object is removed from the contact surface, the light beam is reflected to the light emitting surface by the contact surface.

In one embodiment of the present invention, an optical axis of the light beam is perpendicularly incident to the light incident surface.

In one embodiment of the present invention, a refractive index of the prism is between 1.2 and 1.9, an included angle between the reflective surface and the contact surface is between 50 degrees and 125 degrees, and an included angle between the reflective surface and the light incident surface is between 30 degrees and 60 degrees.

In one embodiment of the present invention, a DOF of the first condenser is between 5 millimeters and 30 millimeters.

In one embodiment of the present invention, the first condenser comprises at least a lens In one embodiment of the present invention, the optical control module further comprises a second condenser disposed between the light source and the prism.

In one embodiment of the present invention, the second condenser comprises at least a lens.

In one embodiment of the present invention, the optical control module further comprising a circuit board. The light source and the image sensor are disposed on the circuit board.

In the present invention, because the light source and the image sensor are disposed on the same circuit board, the optical scrolling module can be applied to multiple types of mice with different shapes. Therefore, the optical scrolling module of the present invention is suitable for mass production, such that the production cost is reduced. Furthermore, the optical control module of the present invention can be applied to multiple types of electrical products to be served as a button, a pointing device or an optical scrolling module.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

First Embodiment

Figure 2:
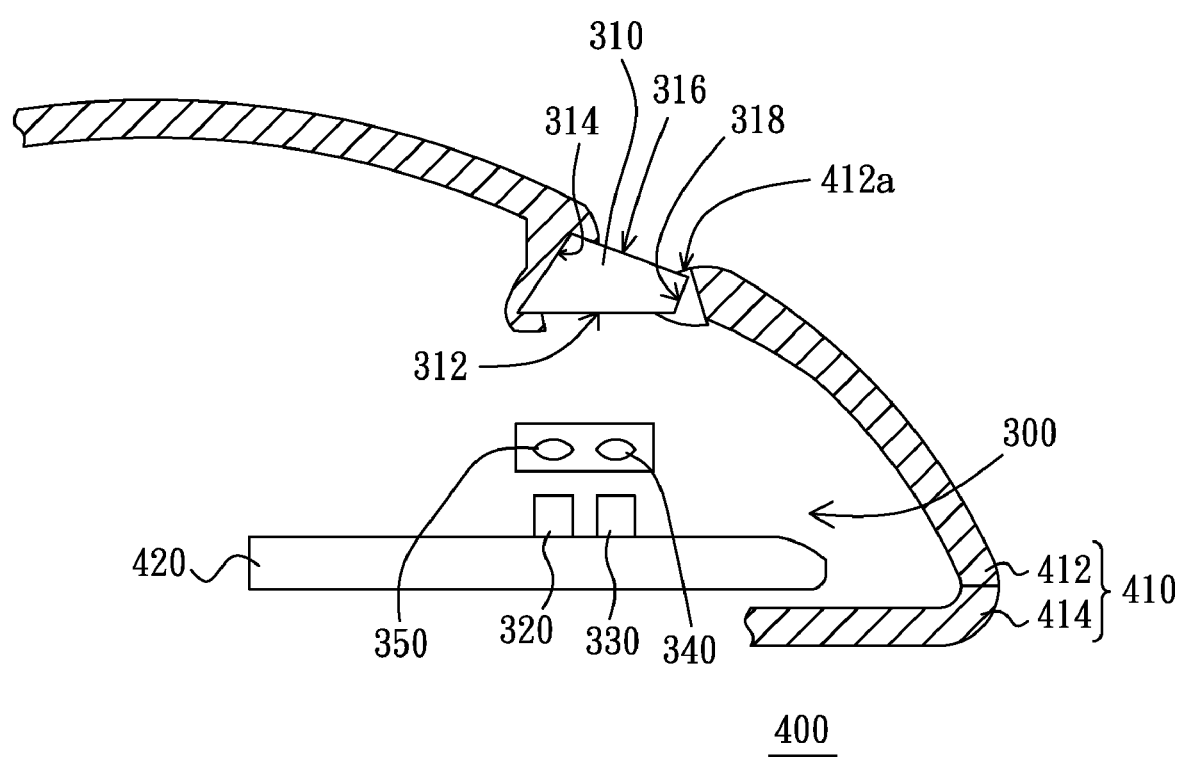
FIG. 2 is a schematic view of an optical scrolling module according to the first embodiment of the present invention.

FIG. 2 is a schematic view of an optical scrolling module according to the first embodiment of the present invention. Referring to FIG. 2, an optical scrolling module 300 of the first embodiment is adapted to be applied to a mouse 400. The mouse 400 has a housing 410 and a circuit board 420 disposed in the housing 410. The housing 410 comprises an upper shell 412 and a bottom shell 414, wherein the upper shell 412 has an opening 412a.

The optical scrolling module 300 comprises a prism 310, a light source 320, an image sensor 330 and a first condenser 340. The prism 310 is disposed at the opening 412a and has a light incident surface 312, a reflective surface 314, a contact surface 316 and a light emitting surface 318. The contact surface 316 is connected between the reflective surface 314 and the light emitting surface 318 and is exposed by the opening 412a. An user can put an object (e.g. a finger) having a pattern structure on the contact surface 316 to operate the optical scrolling module 300. The light incident surface 312 is connected between the reflective surface 314 and the light emitting surface 318 and faces the circuit board 420. The light source 320 and the image sensor 330 are disposed on the circuit board 420, and the first condenser 340 is disposed between the image sensor 330 and the prism 310.

Figure 3A:
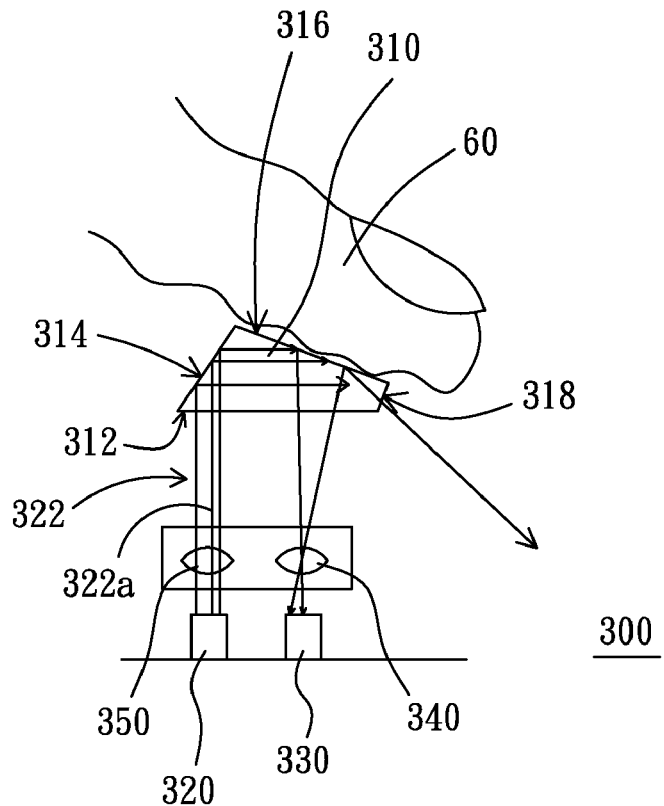
FIG. 3A is a schematic diagram showing a transmission path of a light beam provided by the light source when the object contacts the optical scrolling module of FIG. 2.
Figure 3B:
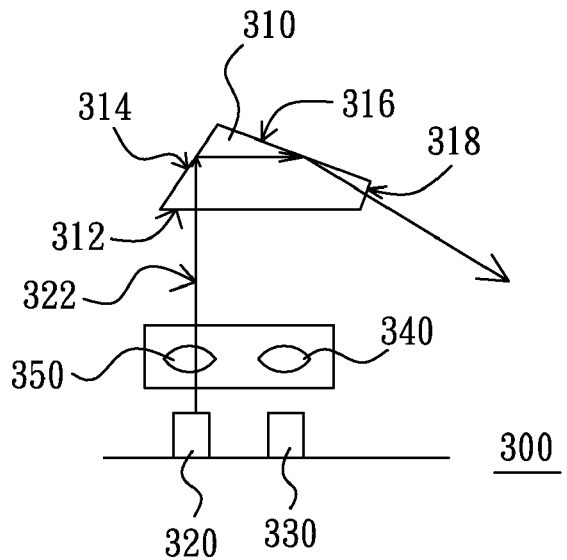
FIG. 3B is a schematic diagram showing a transmission path of a light beam provided by the light source when the object does not contact the optical scrolling module of FIG. 2.

FIG. 3A is a schematic diagram showing a transmission path of a light beam provided by the light source when the object contacts the optical scrolling module of FIG. 2, and FIG. 3B is a schematic diagram showing a transmission path of a light beam provided by the light source when the object does not contact the optical scrolling module of FIG. 2. Referring to FIG. 3A firstly, the light source 320 can be, but not limited to, a laser diode (LD) or a light emitting diode (LED). The light source 320 is for providing a light beam 322 to the prism 310, and the light beam 322 is incident to the prism 310 via the light incident surface 312 and is transmitted to the reflective surface 314. The reflective surface 314 reflects the light beam 322 to the contact surface 316. When the user puts the object (e.g. the finger 60) having the pattern structure on the contact surface 316, the light beam 322 transmitted to the contact surface 316 is scattered by the pattern structure (i.e. the fingerprint) of the finger 60, and then a portion of the light beam 322 is transmitted to the image sensor 330 via the first condenser 340.

In addition, the first condenser 340 includes, for example, at least a lens and is for focusing the light beam 322 on the image sensor 330. The image sensor 330 is, for example, a CMOS image sensor or a charge coupled device (CCD) and is for converting a received optical signal into an electrical signal. Therefore, when the finger 60 moves on the contact surface 316, the image sensor 330 could sense a moving direction of the finger 60, and then the mouse 400 could scroll a scroll bar in a window displayed by a screen according to the electrical signal provided by the image sensor 330. Furthermore, the image sensor 330 could sense whether the finger 60 contacts the contact surface 316 or not, so the optical scrolling module 300 may further has a button function.

Referring to FIG. 3B, when the object (e.g. the finger 60) is removed from the contact surface 316, the light beam 322 transmitted to the contact surface 316 is reflected to the light emitting surface 318 by the contact surface 316, so the image sensor 330 could not receive the optical signal.

To let the transmission path of the light beam 322 accord with expected, an incident angle of an optical axis 322a of the light beam 322 incident to the light incident surface 312, a refractive index of the prism 310, an included angle between the reflective surface 314 and the contact surface 316 and an included angle between the reflective surface 314 and the light incident surface 312 can be controlled. In one embodiment of the present invention, the optical axis 322a of the light beam 322 is, for example, perpendicularly incident to the light incident surface 312, the refractive index of the prism 310 is, for example, between 1.2 and 1.9, the included angle between the reflective surface 314 and the contact surface 316 is, for example, between 50 degrees and 125 degrees, and the included angle between the reflective surface 314 and the light incident surface 312 is, for example, between 30 degrees and 60 degrees.

Furthermore, the optical scrolling module 300 can further comprise a second condenser 350 disposed between the light source 320 and the prism 310 to condense the light beam 322. The second condenser 350 can includes at least a lens. In addition, the first condenser 340 and the second condenser 350 can be integrated into one piece.

Figure 1:
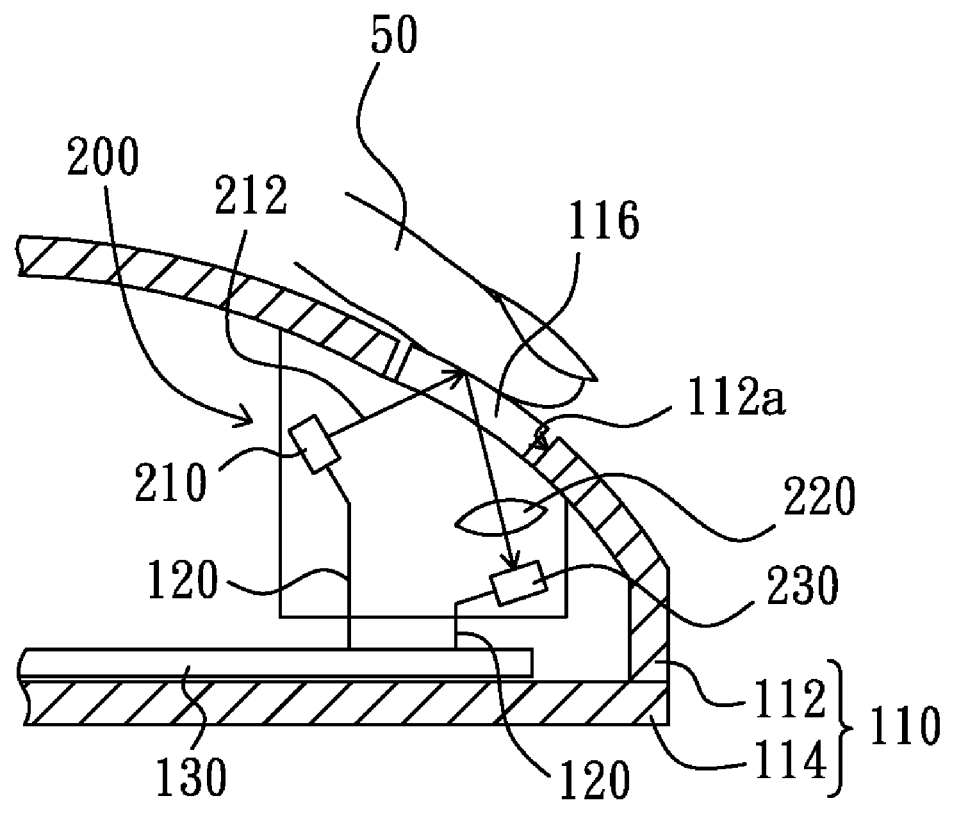
FIG. 1 is a schematic view of an optical scrolling module of a conventional mouse.

Comparing the present embodiment with the conventional technique of FIG. 1, the light source 320 and the image sensor 330 of the optical scrolling module 300 are disposed on the circuit board 420, so the optical scrolling module 300 can be applied to multiple housings with different shapes. In other word, the optical scrolling module 300 of the present embodiment is suitable for mass production, such that the production cost is reduced.

Furthermore, because different housings may have different thicknesses, a DOF of the first condenser 340 can be limited to let the image sensor 330 can clearly receive the optical signal. More specifically, the DOF of the first condenser 340 of the present embodiment is, for example, between 5 millimeters and 30 millimeters.

Second Embodiment

Figure 4A:
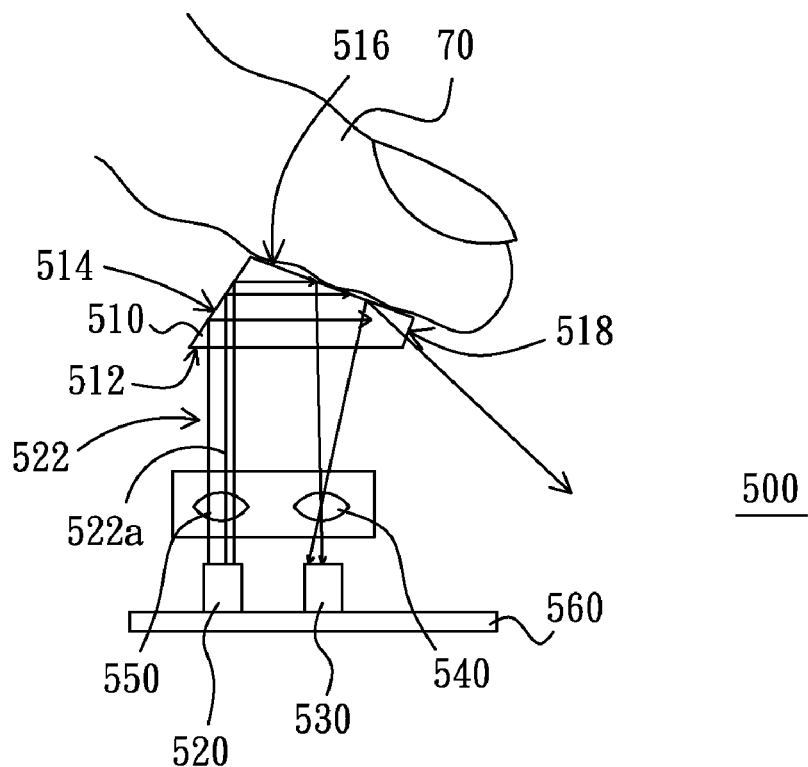
FIGS. 4A and 4B are schematic view of an optical control module according to the second embodiment of the present invention.
Figure 4B:
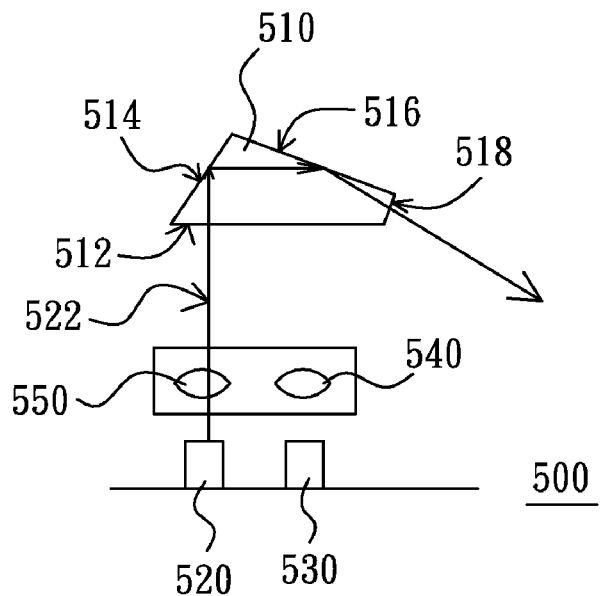

FIGS. 4A and 4B are schematic view of an optical control module according to the second embodiment of the present invention. Referring to FIGS. 4A and 4B, an optical control module 500 of the present embodiment comprises a prism 510, a light source 520, an image sensor 530 and a first condenser 540. The prism 510 has a light incident surface 512, a reflective surface 514, a contact surface 516 and a light emitting surface 518. The contact surface 516 is connected between the reflective surface 514 and the light emitting surface 518, the light incident surface 512 is connected between the reflective surface 514 and the light emitting surface 518 and faces the light source 520. The image sensor 530 may be disposed beside the light source 520, and the first condenser 540 is disposed between the image sensor 530 and the prism 510.

In the optical control module 500, the light source 520 can be, but not limited to, an LD or an LED. The light source 520 is for providing a light beam 522 to the prism 510. The light beam 522 is incident to the prism 510 via the light incident surface 512, and is transmitted to the reflective surface 514. Then, the light beam 522 is reflected to the contact surface 516 of the reflective surface 514.

Referring to FIG. 4A, when an user puts an object (e.g. a finger 70) having a pattern structure on the contact surface 516, the light beam 522 transmitted to the contact surface 516 is scattered by the pattern structure (i.e. a fingerprint) of the finger 70, and then a portion of the light beam 522 is transmitted to the image sensor 530 via the first condenser 540. Moreover, the first condenser 540 includes, for example, at least a lens and is for focusing the light beam 522 on the image sensor 530. The image sensor 530 is, for example, a CMOS image sensor or a CCD and is for converting the received optical signal into an electrical signal. Therefore, the image sensor 530 could sense operating actions, such as moving and pressing etc., of the finger 70 operating on the contact surface 516.

Referring to FIG. 4B, when the object (e.g. the finger 70) is removed from the contact surface 516, the light beam 522 transmitted to the contact surface 516 is reflected to the light emitting surface 518 by contact surface 516, so the image sensor 530 could not receive the optical signal.

In one embodiment of the present invention, the optical control module 500 may further comprise a second condenser 550 disposed between the light source 520 and the prism 510 to condense the light beam 522. The second condenser 550 is, for example, including at least a lens. Further, the light source 520 and the image sensor 530 are disposed on a circuit board 560 of the optical control module 500. When the optical control module 500 is applied to an electrical apparatus, the circuit board 560 and a circuit board of the electrical apparatus can be integrated into one piece.

Because the image sensor 530 of the optical control module 500 could sense the operating actions of the finger 70 operating on the contact surface 516, the image sensor 530 can be applied to multiple types of electrical apparatuses. The prism 510 of the optical control module 500 is embedded in a housing of the electrical apparatus. More specifically, the optical scrolling module 300 of FIG. 2 is an applying example of the optical control module 500 of the present embodiment. Moreover, the optical control module 500 can be applied to portable electrical apparatuses, such as a notebook PC, a mobile phone, and a music player etc., to be served as a pointing device or a button.

Similar to the first embodiment, to let the transmission path of the light beam 522 accord with expected, an incident angle of an optical axis 522a of the light beam 522 incident to the light incident surface 512, a refractive index of the prism 510, an included angle between the reflective surface 514 and the contact surface 516 and an included angle between the reflective surface 514 and the light incident surface 512 can be controlled. In one embodiment of the present invention, the optical axis 522a of the light beam 522 is, for example, perpendicularly incident to the light incident surface 512, the refractive index of the prism 510 is, for example, between 1.2 and 1.9, the included angle between the reflective surface 514 and the contact surface 516 is between 50 degrees and 125 degrees, and the included angle of the reflective surface 514 and the light incident surface 512 is, for example, between 30 degrees and 60 degrees.

Furthermore, because different electrical apparatuses may have different thickness, a DOF of the first condenser 540 can be limited to let image sensor 530 can clearly receive the optical signal when the optical control module 500 is applied to different electrical apparatus. More specifically, the DOF of the first condenser 540 of the present embodiment is, for example, between 5 millimeters and 30 millimeters.

In summary, the present invention can achieve at least the following advantages.

1. In the optical scrolling module of the present invention, because the light source and the image sensor are disposed on the same circuit board, the optical scrolling module can be applied to multiple types of mice with different shapes. Therefore, the optical scrolling module of the present invention is suitable for mass production, such that the production cost is reduced.

2. The image sensor of the optical control module of the present invention could sense the operating actions of the finger operating on the contact surface, so the optical control module can be applied to multiple types of electrical products to be served as a button, a pointing device or an optical scrolling module.

3. By controlling the DOF of the first condenser, the image sensor can clearly receive the optical signal.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical scrolling module for a mouse, the mouse having a housing and a circuit board disposed in the housing, an upper shell of the housing having an opening, the optical scrolling module comprising:

a prism disposed at the opening and having a light incident surface, a reflective surface, a contact surface and a light emitting surface, the contact surface being connected between the reflective surface and the light emitting surface and being exposed by the opening, and the light incident surface being connected between the reflective surface and the light emitting surface and facing the circuit board;

a light source disposed on the circuit board for providing a light beam;

an image sensor disposed on the circuit board; and a first condenser disposed between the image sensor and the prism, wherein, the light beam is transmitted to the reflective surface via the light incident surface and is reflected to the contact surface by the reflective surface, when an object having a pattern structure contacts the contact surface, the light beam transmitted to the contact surface is scattered and then a portion of the light beam is transmitted to the image sensor via the first condenser, when the object is removed from the contact surface, the light beam is reflected to the light emitting surface by the contact surface.

2. The optical scrolling module as claimed in claim 1, wherein an optical axis of the light beam is perpendicularly incident to the light incident surface.

3. The optical scrolling module as claimed in claim 1, wherein a refractive index of the prism is between 1.2 and 1.9, an included angle between the reflective surface and the contact surface is between 50 degrees and 125 degrees, and an included angle between the reflective surface and the light incident surface is between 30 degrees and 60 degrees.

4. The optical scrolling module as claimed in claim 1, wherein a depth of field of the first condenser is between 5 millimeters and 30 millimeters.

5. The optical scrolling module as claimed in claim 1, wherein the first condenser comprises at least a lens.

6. The optical scrolling module as claimed in claim 1 further comprising a second condenser disposed between the light source and the prism.

7. The optical scrolling module as claimed in claim 6, wherein the second condenser comprises at least a lens.

8. An optical control module, comprising:

a light source for providing a light beam;

a prism having a light incident surface, a reflective surface, a contact surface and a light emitting surface, the contact surface being connected between the reflective surface and the light emitting surface, and the light incident surface being connected between the reflective surface and the light emitting surface and facing the light source;

an image sensor; and a first condenser disposed between the image sensor and the prism, wherein, the light beam is transmitted to the reflective surface via the light incident surface and is reflected to the contact surface by the reflective surface, when an object having a pattern structure contacts the contact surface, the light beam transmitted to the contact surface is scattered and then a portion of the light beam is transmitted to the image sensor via the first condenser, when the object is removed from the contact surface, the light beam is reflected to the light emitting surface by the contact surface.

9. The optical control module as claimed in claim 8, wherein an optical axis of the light beam is perpendicularly incident to the light incident surface.

10. The optical control module as claimed in claim 8, wherein a refractive index of the prism is between 1.2 and 1.9, an included angle between the reflective surface and the contact surface is between 50 degrees and 125 degrees, and an included angle between the reflective surface and the light incident surface is between 30 degrees and 60 degrees.

11. The optical control module as claimed in claim 8, wherein a depth of field of the first condenser is between 5 millimeters and 30 millimeters.

12. The optical control module as claimed in claim 8, wherein the first condenser comprises at least a lens.

13. The optical control module as claimed in claim 8 further comprising a second condenser disposed between the light source and the prism.

14. The optical control module as claimed in claim 13, wherein the second condenser comprises at least a lens.

15. The optical control module as claimed in claim 8 further comprising a circuit board, wherein the light source and the image sensor are disposed on the circuit board.

* * * * *